Figure 1:
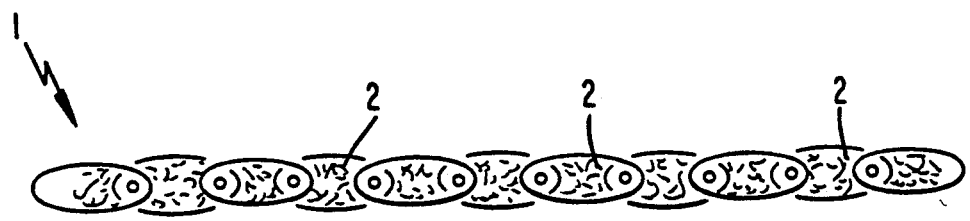

United States Patent [19]

Salminen et al.

[11] Patent Number: 5,006,399
[45] Date of Patent: Apr. 9, 1991

[54] PLANAR TEXTILE STRUCTURE

[75] Inventors: Ari Salminen, Suorama; Suorama Rautanen, Tampere, both of Finland

[73] Assignee: Tamfelt OY AB, Tampere, Finland

[21] Appl. No.: 346,354

[22] Filed: Apr. 28, 1989

Related U.S. Application Data

[63] Continuation of Ser. No. 134,571, Dec. 14, 1987, abandoned.

[30] Foreign Application Priority Data

Dec. 15, 1986 [FI] Finland .................................. 865094

[51] Int. Cl.⁵ .............................................. D03D 3/00
[52] U.S. Cl. ...................................... 428/224; 728/90; 728/284; 728/288
[58] Field of Search .................... 428/40, 224, 284, 288

[56] References Cited

U.S. PATENT DOCUMENTS

| | | | |
|---|---|---|---|
| 3,485,706 | 12/1969 | Evans | 19/161 |
| 3,956,553 | 5/1976 | Palmer et al. | 428/90 |
| 3,961,116 | 6/1976 | Klein | 428/90 |
| 3,993,806 | 11/1976 | Athey | 428/90 |
| 4,018,956 | 4/1977 | Casey | 428/90 |
| 4,107,367 | 8/1978 | Fekete | 428/234 |
| 4,180,606 | 12/1974 | Hance et al. | 428/90 |
| 4,251,587 | 2/1981 | Mimura et al. | 428/299 |
| 4,293,604 | 10/1981 | Campbell | 428/90 |
| 4,308,303 | 12/1981 | Mastroianni et al. | 428/90 |
| 4,352,214 | 10/1982 | Betz | 428/90 |
| 4,413,391 | 11/1983 | Ranjilian et al. | 428/288 |
| 4,567,077 | 1/1986 | Gauthier | 428/114 |
| 4,610,905 | 9/1986 | von Blucher et al. | 428/90 |

FOREIGN PATENT DOCUMENTS

| | | |
|---|---|---|
| 2419751 | 12/1975 | Fed. Rep. of Germany . |
| 53844 | 5/1978 | Finland . |
| 844137 | 10/1984 | Finland . |
| 2494318 | 5/1982 | France . |
| 1390181 | 4/1975 | United Kingdom . |
| 1441711 | 7/1976 | United Kingdom . |
| 1455843 | 11/1976 | United Kingdom . |
| 1482260 | 8/1977 | United Kingdom . |
| 1493661 | 11/1977 | United Kingdom . |
| 2147849 | 5/1985 | United Kingdom . |

*Primary Examiner*—James J. Bell
*Attorney, Agent, or Firm*—Lowe, Price, LeBlanc, Becker & Shur

[57] ABSTRACT

The invention relates to a planar textile structure, particularly a paper machine textile or a textile for the purposes of filtration, comprising a load-bearing basic structure. In order to enable a rapid and advantageous adjustment of the properties of the planar textile structure, staple fibres are applied to the basic structure. The staple fibre may be applied within the basic structure or to at least one surface thereof.

16 Claims, 1 Drawing Sheet

PLANAR TEXTILE STRUCTURE

This application is a continuation of application Ser. No. 134,571, filed Dec. 14, 1987, now abandoned.

The invention relates to a planar textile structure, particularly a paper machine textile or a textile intended for the purposes of filtration, comprising a load-bearing basic structure.

Textile structures of this type have been used for tens of years in the paper and process industries in particular. A problem with this kind of textile structures has been the provision of desired properties according to the operating conditions in each particular case. Such properties include the surface smoothness, size of the contact surface, pore size, and permeability.

Attempts have been made previously to adjust these properties e.g. by weaving a high thread count surface layer of thin threads in addition to the basic structure. In this way, a satisfactory result can be achieved in some cases, whereas the manufacture is relatively laborious and slow.

The permeability of a planar textile structure has also been tried to be adjusted by introducing liquid foam or foam-producing agent into the basic structure. This type of solutions include the solution disclosed in Finnish Patent Application 844 137. A drawback of this known structure is the low mechanical strength, because the walls between the foam cells become weak during foaming and thus possess a poor mechanical strength.

It is also known to adjust the permeability by means of various filling threads positioned in the basic structure. Further, it is known to suitably after the cross-sectional shape of the threads in the basic structure. A drawback of these solutions is that they are difficult to effect and, on the other hand, the permeability cannot be adjusted to any greater degree.

It is also known to fasten different kinds of silver layers to the basic structure by needling. A drawback of this solution is that it is thereby necessary to first form a separate sliver layer the needling of which may damage the basic structure.

The object of the invention is to provide a planar textile structure by means of which the above drawbacks can be eliminated. This is achieved by means of a planar textile structure according to the invention which is characterized in that staple fibres are applied to the basic structure. The term staple fibre refers to staple fibres beginning from very short fibres of e.g. about 0.5 mm, including a so called flock fibre which can be applied to the surface of or within the basic structure without any mechanical fastening such as needling, and longer fibres which can be fastened to the surface portions of the structure without any sliver formation and needling.

An advantage of the invention is that the filling degree, pore size, permeability, surface smoothness and the size of the internal area can be adjusted in an advantageous manner. The application of staple fibres to the basic structure by a spreading technique is also rapid to carry out, so that the costs are low in this respect. In addition, the staple fibre material can be fastened to the basic structure extremely firmly, because the grip surface is remarkably large. A further advantage of the solution according to the invention is the high mechanical strength thereof. The solution according to the invention also enables a high filling degree to be obtained e.g. in cases where staple fibres are fastened to the threads prior to the manufacture of the basic structure. Thereby the air permeability, too, is low.

Figure 2:
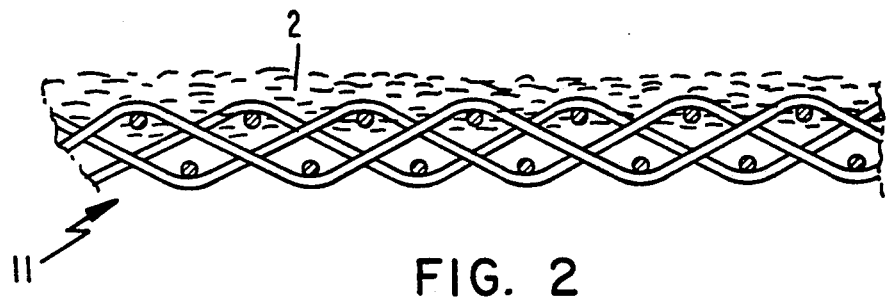
Figure 3:
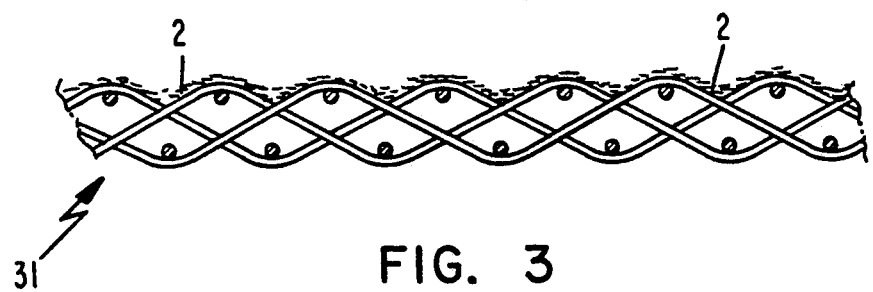

The invention will be described in the following in more detail by means of the preferred embodiments shown in the attached drawing, wherein FIG. 1 is a general view of a spiral woven fabric within which staple fibres are applied, FIG. 2 is a general view of a woven fabric to the surface of which staple fibres are applied, FIG. 3 is a general view of a woven fabric to the surface of which staple fibres are applied by a flocking technique.

In the embodiment of FIG. 1 the basic structure of the planar textile structure is indicated with the reference numeral 1. In the example of FIG. 1, the basic structure consists of a spirally woven fabric.

A spirally woven fabric and the manufacture thereof are fully obvious for one skilled in the art, so these matters are not more closely discussed herein.

In the embodiment of FIG. 1, a staple fibre material 2 and a possible binder are applied within the basic structure 1. The short staple fibres and the possible binder thereby form together a continuous porous structure which fills at least part of the pores of the basic structure. In this embodiment, the staple fibres 2 and the binder have been applied simultaneously so that the staple fibres are wholly surrounded by the binder. This arrangement enables the staple fibres 2 to be arbitrarily bound to each other and to the basic structure. The staple fibres thus form e.g. an independent three-dimensional structure.

The permeability and the pore size are adjusted by choosing the fibre size, the fibre density, and the amount of binder as required by the operating conditions in each particular case. In addition to the staple fibres 2, some other suitable materials, such as a monofilament filler, can be used for the adjustment of the permeability.

In the embodiment of FIG. 2, the basic structure is indicated with the reference numeral 11. In this embodiment, a layer formed by staple fibres 2 and a binder is applied to the top surface of the woven fabric forming the basic structure 11. In this embodiment, too, the staple fibre material and the binder form an integral continuous structure. Moreover, the layer formed by the staple fibres and the binder is applied to the surface of the basic structure 11 so that the layer penetrates into the basic structure 11 to some extent for improving the grip. The surface smoothness, the size of the contact surface, the pore size and the permeability are adjusted by suitably choosing the fibre size, the amount of binder, and the thickness of the layer. Of course, it is also possible to calender the surface for achieving the greatest possible smoothness and the largest possible contact surface.

In the formation of the surface layer it is also possible to use several fibre lengths, e.g. in such a way that the fibres spread on the surface are longer. A layer formed by shorter fibres can also be used as a fastening surface or layer for other surface layers and treatments. These include the fastening of sliver or some other planar structure.

The staple-fibre-binder structure shown in the embodiments of FIGS. 1 and 2 can be manufactured e.g. in the following way: The staple fibres and the foam-producing binder are mixed with each other before the spreading, so that the staple fibres are made to disperse in the binder dispersion foam. The mixture of the foam and the staple fibres can be spread e.g. by a knife method or other such coating method. The stability of the binder foam can be adjusted so that the foam collapses after the application, whereby the remaining binder having substantially no pores binds the staple fibres positioned in a three-dimensional crosswise relationship to each other and to the basic structure. The obtained permeable structure according to FIG. 1, for instance, is formed by arbitrarily grouped staple fibres and binder.

In the embodiment of FIG. 3, the basic structure is indicated with the reference numeral 31. In this embodiment, the staple fibre material 2 is attached to an adhesive layer applied to the surface of a woven fabric forming the basic structure 31. This arrangement provides a finely divided fibre surface, the smoothness of which can be improved e.g. by calendering.

The embodiments described above are by no means intended to restrict the invention, but it is obvious that the invention can be modified within the scope of the claims in various ways. Accordingly, it is obvious that e.g. the use of a binder is not necessary, but the staple fibres can be fastened physically, e.g. by means of heat, in place of a chemically acting binder. It is also possible to use a way of fastening based on the combination of a binder and a physical way of fastening. As stated above, the staple fibres may as well be positioned in a matrix formed by a porous binder, whereby it is possible to affect the strength and the stiffness as well as the permeability of the structure by means of the fibres. The binder may consist of any suitable binding agent such as a polymeric material. The basic structure, either, is not restricted in any way; instead, it can be of any structure known per se or a combination of known structures. Such known structures include a woven fabric, a knitted fabric, a spiral fabric, wad, or a combination of these structures. The staple fibre material can be of any kind. It is not necessary to apply the staple fibres to all parts of the planar textile structure, though this, naturally, is also possible.

We claim:

1. A planar textile material comprising a load-bearing basic structure and staple fibres adhered to and dispersed within a binder dispersion foam applied to the surface of and/or within the basic structure without flocking, said staple fibers including at least one of
   a. very short fibres of approximately 0.5 mm length,
   b. flock fibres applied to the surface of or within said basic structure without mechanical fastening, and
   c. fibres fastenable to surface portions of said basic structure without needling or silver formation,
said staple fibres being arbitrarily bound to each other and to said basic structure so that said staple fibres form at least one continuous-three dimensional porous structure.

2. A planar textile material according to claim 1 wherein the staple fibres form, together with the binder, said continuous three-dimensional structures filling at least part of the pores of the basic structure.

3. A planar textile material according to claim 2 wherein the staple fibres are wholly surrounded by the binder, which enables the staple fibres to be bound arbitrarily to each other and to the basic structure.

4. A planar textile material according to claim 3, wherein the continuous three-dimensional structures formed by the staple fibres and the binder is porous.

5. A planar textile material according to claim 1 wherein the staple fibres are adhered in position by means of a combination of a binder and a physical fastening.

6. A planar textile material according to claim 1 wherein the staple fibres are applied only within the basic structure.

7. A planar textile material according to claim 1 wherein the staple fibres are applied only to at least one surface of the basic structure.

8. A planar textile material according to claim 7 wherein the staple fibres are applied to the surface of the basic structure so that the staple fibres penetrate partly into the basic structure for improving the grip therewith.

9. A planar textile material as claimed in claim 1 wherein said staple fibres is applied in plural layers.

10. A planar textile material as claimed in claim 9 wherein a layer of shorter fibres is used as a fastening surface for at least a further layer.

11. A planar textile material as claimed in claim 9 wherein successive layers are comprised of relatively longer staple fibres than respectively preceding ones of said layers of said staple fibres.

12. A paper machine planar textile material comprising a load-bearing basic structure and staple fibers adhered to and dispersed within a binder dispersion foam applied to the surface of and/or within the basic structure without flocking, said staple fibers including at least one of
   a. very short fibers of approximately 0.5 mm length,
   b. flock fibers applied to the surface of or within said basic structure without mechanical fastening, and
   c. fibers fastenable to surface portions of said basic structure without needling or silver formation,
said staple fibers being arbitrarily bound to each other and to said basic structure so that said staple fibers form at least one continuous-three dimensional porous structure.

13. The material according to claim 1, wherein said binder dispersion foam is a foam producing binder having said fibres mixed therein and applied to the basic structure with the foam having subsequently collapsed.

14. A material according to claim 1, wherein the binder dispersion foam having the staple fibres dispersed therein is applied within the basic structure.

15. A material according to claim 1 wherein the binder dispersion foam having the staple fibres dispersed therein is spread onto at least one surface of the basic structure.

16. A planar paper machine or filtration textile material according to claim 15, wherein binder dispersion foam having the staple fibres dispersed therein is spread onto the surface of the basic structure so that the staple fibres penetrate partly into the basic structure for improving the grip therewith.

* * * * *

UNITED STATES PATENT AND TRADEMARK OFFICE
CERTIFICATE OF CORRECTION

PATENT NO.  : 5,006,399
DATED       : April 9, 1991
INVENTOR(S) : Ari Salminen, et. al.

It is certified that error appears in the above-indentified patent and that said Letters Patent is hereby corrected as shown below:

Inventor:

On the Title page, item [75], delete second occurrence of Suorama and insert-- Ari Salminen, Suorama; Aimo Rautanen, Tampere, both of Finland--.

Signed and Sealed this

Seventh Day of September, 1993

Attest:

BRUCE LEHMAN

Attesting Officer     Commissioner of Patents and Trademarks